(12) United States Patent
Michtchenko et al.

(10) Patent No.: US 7,809,134 B2
(45) Date of Patent: Oct. 5, 2010

(54) METHOD FOR ENCRYPTING INFORMATION AND DEVICE FOR REALIZATION OF THE METHOD

(76) Inventors: Valentin Alexandrovich Michtchenko, Chehova Str. 3, Apt. #34, Minsk (BY) 220035; Uladzimir Uladzimirovich Zakharau, 50 Let Pobedy Str. 1-2-22, Minsk (BY) 220056; Yuri Victorovich Vilanski, Tashkentskaya Str. 26-1-88, Minsk (BY) 220066; Dzmitry Iiharavich Verzhbalovich, 50 Let Pobedy Str. 9-33, Minsk (BY) 220056

( * ) Notice: Subject to any disclaimer, the term of this patent is extended or adjusted under 35 U.S.C. 154(b) by 395 days.

(21) Appl. No.: 11/742,151

(22) Filed: Apr. 30, 2007

(65) Prior Publication Data

US 2008/0080709 A1    Apr. 3, 2008

Related U.S. Application Data

(63) Continuation of application No. 10/018,943, filed as application No. PCT/BY99/00005 on Apr. 27, 1999, now abandoned.

(51) Int. Cl.
*H04L 9/00* (2006.01)
(52) U.S. Cl. .............. 380/29; 380/30; 380/44
(58) Field of Classification Search ............ 380/28–30, 380/44
See application file for complete search history.

(56) References Cited

U.S. PATENT DOCUMENTS

| | | | | |
|---|---|---|---|---|
| 3,798,360 | A * | 3/1974 | Feistel | 380/37 |
| 4,905,277 | A | 2/1990 | Nakamura | |
| 5,008,936 | A * | 4/1991 | Hamilton et al. | 380/281 |
| 5,222,139 | A | 6/1993 | Takaragi et al. | |
| 5,323,464 | A * | 6/1994 | Elander et al. | 713/191 |
| 5,365,589 | A * | 11/1994 | Gutowitz | 380/43 |
| 5,412,729 | A * | 5/1995 | Liu | 380/37 |
| 5,416,841 | A * | 5/1995 | Merrick | 380/29 |
| 5,452,358 | A * | 9/1995 | Normile et al. | 380/42 |
| 5,533,127 | A * | 7/1996 | Luther | 380/28 |
| 5,539,827 | A * | 7/1996 | Liu | 380/37 |
| 5,680,462 | A | 10/1997 | Miller et al. | |
| 5,933,501 | A * | 8/1999 | Leppek | 380/259 |
| 6,044,388 | A * | 3/2000 | DeBellis et al. | 708/254 |
| 6,047,242 | A * | 4/2000 | Benson | 702/35 |

OTHER PUBLICATIONS

Menezes et al. "Handbook of Applied Cryptography",5th edition, CRC press, 1997, pp. 250-282.*

* cited by examiner

*Primary Examiner*—Benjamin E Lanier
*Assistant Examiner*—Hadi Armouche
(74) *Attorney, Agent, or Firm*—Bardmesser Law Group

(57) ABSTRACT

The cryptographic system and method for securing data from unauthorized access includes, in one embodiment, an iterative probabilistic cipher for converting plaintext into ciphertext comprising at least two components, a core and a flag. A corresponding key and the core and flag may be output in one or more data channels. For each round of encryption additional keys, cores and flags can be generated. Unless all keys, cores and flags are known, no recovery of the plaintext can be possible.

17 Claims, 6 Drawing Sheets

METHOD FOR ENCRYPTING INFORMATION AND DEVICE FOR REALIZATION OF THE METHOD

CROSS-REFERENCE TO RELATED APPLICATIONS

This application is a continuation of U.S. application Ser. No. 10/018,943 filed Mar. 25, 2002, which is the National Stage of International Application No. PCT/BY99/00005, filed Apr. 27, 1999.

TECHNICAL FIELD

The following relates to a cryptographic system and method for securing data from unauthorized access.

A detailed description and accompanying drawings are set forth below.

DETAILED DESCRIPTION

Figure 1:
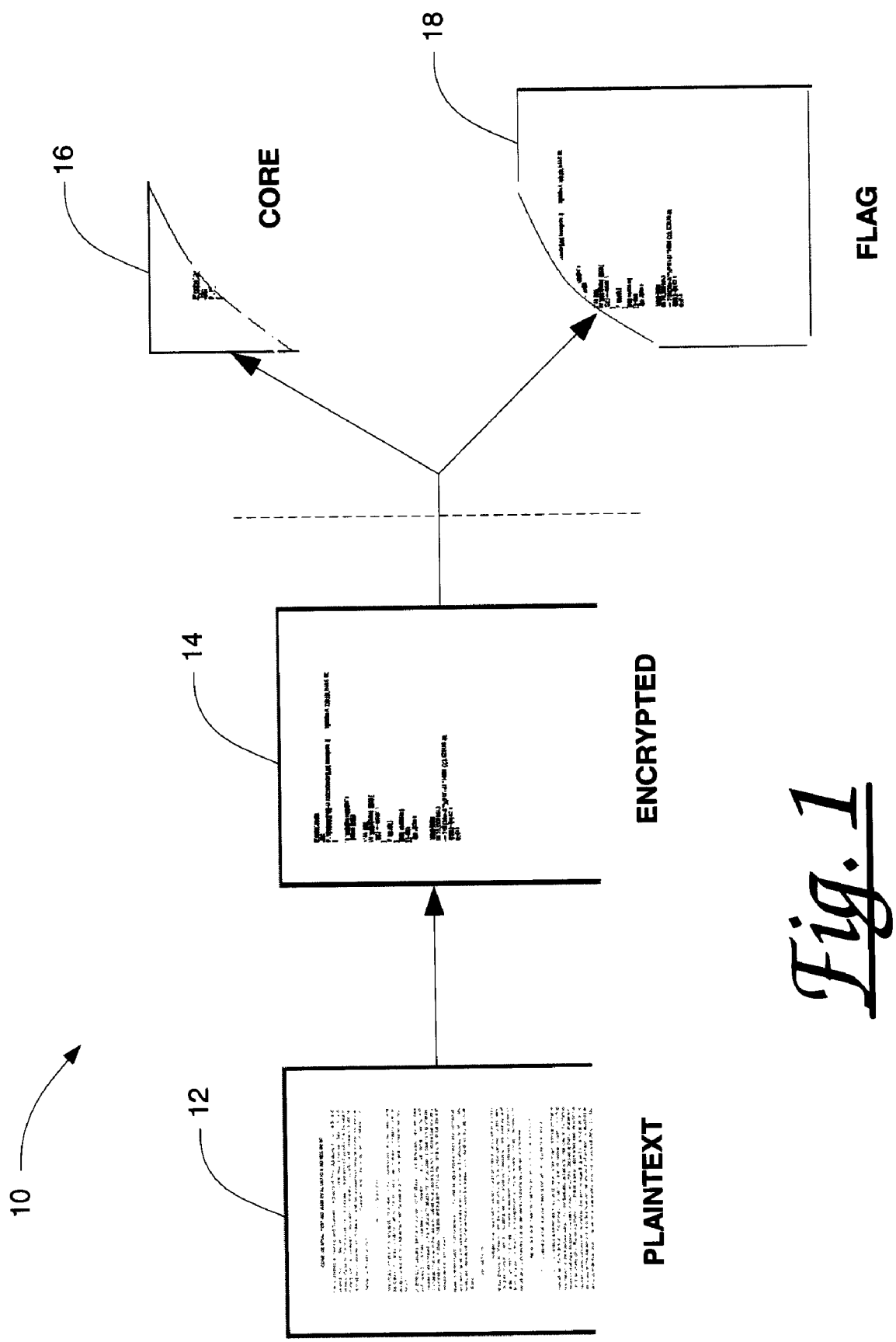
FIG. 1 is a simplified, abstract diagram demonstrating one embodiment of the cryptographic system described herein.

The field of cryptography includes data encryption, which is the process of converting ordinary information, commonly referred to as plaintext, into unintelligible gibberish, commonly referred to as ciphertext. Decryption is the reverse, moving from unintelligible ciphertext to plaintext. A cipher is a pair of algorithms which perform this encryption and the reversing decryption. Typically, the detailed operation of a cipher is controlled both by the algorithm and, in each instance, by a key. The key is a secret parameter, known only to the communicants, for a specific message exchange context. In theory, the process of encryption renders the original information unreadable by interceptors, eavesdroppers, or anyone without secret knowledge, namely, the key needed to decrypt the information.

Main classical cipher types include transposition ciphers, which rearrange the order of letters in a message, and substitution ciphers, which systematically replace letters or groups of letters with other letters or groups of letters. The advent of digital computers and electronics after WWII made possible much more complex ciphers. Furthermore, computers allowed for the encryption of any kind of data that is represented by computers in any binary format, unlike classical ciphers which only encrypted written language texts, dissolving the utility of a linguistic approach to cryptanalysis in many cases. Many computer ciphers can be characterized by their operation on binary bit sequences (sometimes in groups or blocks), unlike classical and mechanical schemes, which generally manipulate traditional characters (i.e., letters and digits) directly. However, computers have also assisted cryptanalysis.

Extensive open academic research into cryptography is relatively recent beginning only in the mid-1970s with the public specification of DES (the Data Encryption Standard) and the public release of the RSA algorithm. Since then, cryptography has become a widely used tool in communications, computer networks, and computer security generally.

The modern field of cryptography can be divided into several areas of study. One such area includes symmetric-key cryptography. Symmetric-key cryptography refers to encryption methods in which both the sender and receiver share the same key, or, less commonly, in which their keys are different, but related in an easily computable way. The modern study of symmetric-key ciphers relates mainly to the study of block ciphers and stream ciphers and to their applications.

Block ciphers take as input a block of plaintext and a key, and output a block of ciphertext of the same size. Since messages are almost always longer than a single block, some method of knitting together successive blocks is required.

The Data Encryption Standard (DES) and the Advanced Encryption Standard (AES) are block cipher designs which have been designated cryptography standards by the US government, though DES's designation was withdrawn after AES was adopted. Despite its deprecation as an official standard, DES remains quite popular; it is used across a wide range of applications, from ATM encryption to e-mail privacy and secure remote access. The DES algorithm uses both transposition and substitution methods. The algorithm comprises plaintext, unencrypted text and a key as binary sequences having 64-bit, 64-bit and 56-bit lengths, respectively. When DES is used in an electronic book or table mode, the 64-bit blocks of plaintext are encoded independently by using one key. The DES algorithm includes 16 rounds or cycles, each of which has simple transpositions combined with substitution in 4-bit groups. In each pass, 48 bits are selected from the full 56-bit key.

DES, however, does not provide a sufficient degree of secrecy. The number of possible key combinations is $2^{64}$. Thus, cyrptoanalysts can decipher DES encoded information by substituting all possible keys during a brute-force attack using modern computer techniques in a relatively short, efficient and economical amount of time. Also, with DES, each encryption of the same plaintext using the same key results in the same output or ciphertext. Analysis reveals the statistical regularity of the correlation between the plaintext and the ciphertext making decryption of the ciphertext without using direct substitution of all the keys possible. The AES cryptosystem suffers from many of the same or similar drawbacks as DES. Many other block ciphers have been designed and released, with considerable variation in quality. Many have been thoroughly broken.

Stream ciphers, in contrast to the "block" type, create an arbitrarily long stream of key material, which is combined with the plaintext bit-by-bit or character-by-character. In a stream cipher, the output stream is created based on an internal state which changes as the cipher operates. That state's change is controlled by the key, and, in some stream ciphers, by the plaintext stream as well. RC4 is an example of a well-known stream cipher.

Symmetric-key cryptosystems typically use the same key for encryption and decryption, though this message or group of messages may have a different key than others. A significant disadvantage of symmetric ciphers is the key management necessary to use them securely. Each distinct pair of communicating parties must, ideally, share a different key, and perhaps each ciphertext exchanged as well. The number of keys required increases as the square of the number of network members, which very quickly requires complex key management schemes to keep them all straight and secret. The difficulty of establishing a secret key between two communicating parties, when a secure channel doesn't already exist between them, also presents a chicken-and-egg problem which is a considerable practical obstacle for cryptography users in the real world.

Another area of cryptography includes public-key (or asymmetric key) cryptography. In public-key cryptography, two different but mathematically related keys are used—a public key and a private key. A public-key system is so constructed that calculation of one key (the 'private key') is computationally infeasible from the other (the 'public key'), even though they are necessarily related. Instead, both keys are generated secretly as an interrelated pair. In public-key cryptosystems, the public key may be freely distributed, while its paired private key must remain secret. The public key is typically used for encryption, while the private or secret key is used for decryption. The RSA algorithm is an example of a public-key system.

As well as being aware of cryptographic history, cryptographic algorithm and system designers must also sensibly consider probable future developments in their designs. For instance, the continued improvements in computer processing power has increased the scope of brute-force attacks when specifying key lengths. For example, the relatively short key length of prior crytosystems permits decryption of ciphertext in an acceptable amount of time. Additionally, a successful attack against prior cryptosystems such as DES, AES and RSA can be accomplished with just one small block of the ciphertext.

Thus, there exists a need for a multi-channel cryptographic system that can encrypt plaintext of any length, quickly and easily, while providing enhanced secrecy and security. Such a cryptographic system would include an iterative probabilistic cipher, capable of using long and variable key lengths, which produces ciphertext comprising three interrelated components, referred to as key, core and flag, for each round or cycle of encryption. The key, core and flag created in a particular round of the encryption process can be stored separately, together, or partially together in different data channels. All three full components, the keys, cores and flags, of such a cryptographic system would be required to decrypt the ciphertext. Such a cryptographic system would be capable of obtaining a different output each time the same plaintext is encrypted using the same master key. So even if the key is known, the data cannot be decrypted.

Accordingly, a cryptographic system and method for securing data from unauthorized access is provided. The present invention is capable of encrypting plaintext of any length rapidly, easily and securely. To this end, the present invention utilizes an iterative probabilistic cipher. Each iteration or round of encryption may resemble a round of a substitution-permutation network where, instead of a single block, the entire plaintext can be processed and repeated over many rounds.

According to the present invention, an arbitrary length plaintext file goes into the encryption process, resulting in three distinct but related output components: a key, a core and a flag. The separation mechanism can be based on the use of special substitution transformations. Upon encryption of the plaintext, two ciphertexts are output, the core and the flag, and, additionally, the corresponding key for tracking the ciphertext are generated. The three components (key, core and flag) can be stored separately and a new set of key, core and flag may be created at every round of decryption and re-encryption.

Of particular note, the size of one of the ciphertext components, the core for example, can be made equal to a preset value irrespective of the plaintext file length. The size of the other ciphertext component, the flag in this example, can be about that of the plaintext. Of course, it should be noted that the relative lengths of the ciphertext component can be varied without departing from the scope of the present invention.

In an exemplary embodiment of the present invention, the unique core may be relatively short in length. This core can be designed to be easily concealed. The core may be interpreted as a specific second random key related to the specific encryption of the plaintext. Separation of the ciphertext into several channels can provide additional freedom for a flexible synthesis for various applications. Manipulating short cores, flags and keys can permit synthesis of systems of distributed data storage, exchange of confidential data, creation of legal playback of digital carriers which cannot be forged (like CDs), and protection of intellectual property, amongst others. For example, the core can be written on a smart card and the flag on an authentication sever. Because space on a smart card may be limited, it may be beneficial to provide a relatively small core. The length of the flag, however, can be similar to the length of the plaintext since the space on an authentication server is voluminous.

As previously mentioned, encryption according to the present invention is extremely fast over large arrays of data and long key lengths, especially when compared to standard cryptographic systems. The cryptographic system of the present invention is more robust than standard systems in that it produces ciphertext consisting of two parts depending on each other, cores and flags, whereas standard systems operate in independent blocks of data. Moreover, the cryptographic system according to the present invention provides greater security than standard encryption schemes. In this regard, with the present invention, all three full components are required—keys, core and flags—to decrypt ciphertext and recover the plaintext. For standard encryption schemes such as DES, AES or RSA, one small block of ciphertext could be enough to surmount a successful attack.

Additionally, the present invention is capable of encrypting data using relatively long key lengths making the algorithm extremely secure. For example, a key length of 4096 bits or more can be used without significantly compromising the speed of encryption. By contrast, standard encryption schemes like a AES cannot go above 256 bits. Of course, the length of keys is only limited by available technology and, thus, longer key lengths are contemplated by the present invention.

In addition to lengthy keys, the size of the key actually used for encryption according to the present invention can vary. For example, the length of the key may be proportional to the number of rounds of encryption. Therefore, a cryptographic analyst would have no real idea of the key length, which inversely affects possibilities of successful attacks. The key length may be chosen according to application or category.

Also enhancing the security of the cryptographic system according to the present invention is that it is pseudo-random in nature. Multiple encryptions of the same plaintext using the same key, results in a different output each time. Thus, even if the key is known, the data cannot be decrypted. Rather, unique core and flag pairs are created no matter how many times the original data is encrypted. Moreover, the present invention allows for the implementation of parallel encryption, which is impossible for several encryption standards such as DES or AES.

Referring now to the drawings, FIG. 1 is a simplified, abstract diagram demonstrating one embodiment of a cryptographic system 10. The cryptographic system 10 can receive ordinary, comprehensible information known as plaintext 12. In the embodiment depicted in FIG. 1, the plaintext 12 is an ordinary text file. However, plaintext refers to any type of intelligible information or data, such as text, images, video, data files, data streams, digital media, or the like. The plaintext 12 can then be encoded to produce unintelligible ciphertext 14. Before the ciphertext 14 is output, however, it may be damaged or harmed in such a way as to produce two ciphertext components, a core 16 and a flag 18. In simple terms, the encoded data is broken or split into its core and flag components and is thus represented in FIG. 1 as so. However, it is to be understood that damaging encoded data to produce the core 16 and the flag 18 can include, as non-limiting examples, any of the following operations, alone or in combination: parsing, substituting, transposing, truncating or whitening (adding null values to at least a portion of the data).

In an embodiment of the present invention, the core 16 can be relatively small and the flag 18 relatively equivalent to the size of the plaintext 12. In this embodiment, the core 16 can be, in a sense, interpreted as a specific second random key related to the specific encryption of the plaintext 12. The flag 18, on the other hand, can be a ciphertext component more representative of the main file. The relatively short core can be easily concealed and separated into one of several data channels providing developers with additional freedom for synthesizing various applications. Thus, irrespective of the size or content of the initial data or plaintext, the core could be made extremely small depending on the application. Of course, it is to be understood that the core, and the flag for that matter, can be any size without departing from the scope of the present invention. To this end, the uniqueness of the core and flag feature of the present invention provides the ability to control the length of these two components by setting the encryption parameters. This allows greater flexibility for the present invention to be integrated with a broad range of applications.

Figure 2:
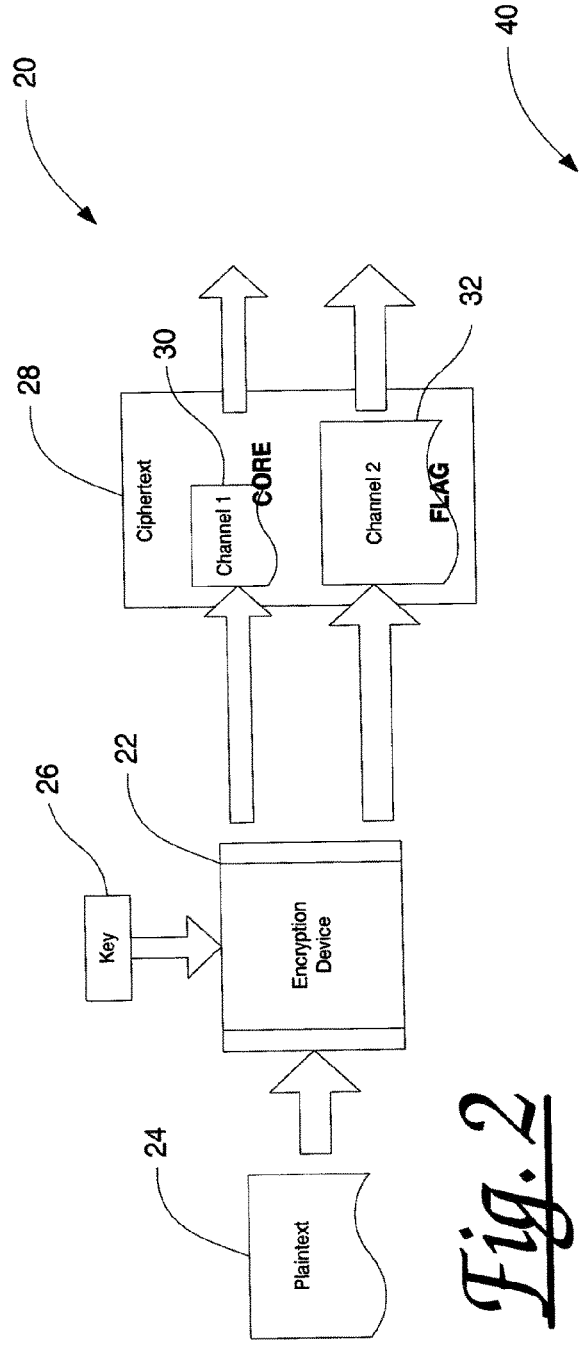
FIG. 2 is a simplified, exemplary block diagram depicting one embodiment of the cryptographic system described herein.

Referring now to FIG. 2, a simplified, exemplary block diagram depicting one embodiment of a cryptographic system 20 is shown. The cryptographic system 20 includes an encryption device 22 that receives plaintext 24 and a key 26. For description purposes only, we shall assume only a single round of encryption. The encryption device 22 takes the plaintext 24, encodes it, then damages it to produce ciphertext 28. The ciphertext 28 according to this embodiment of the present invention comprises at least two components, a core 30 and a flag 32. The length of these two ciphertext components, the core 30 and flag 32, can be parameters of the encryption algorithm allowing them to be defined by a user. For purposes of this application, the term user may include a person, a computer, or a person using a computer. In setting the parameters of the cipher, one may control the lengths of the core 30 and the flag 32 allowing developers greater flexibility in creating new and unique applications. Regardless of their lengths, both the core 30 and the flag 32 along with the key 26 are required to decrypt the ciphertext 28. To ensure the ciphertext 28 created according to the present invention can be decrypted back to the original plaintext 24, the encryption transformation may be invertible, but it is not necessary to use identical algorithms for encryption and decryption.

As shown in FIG. 2, the core 30 and the flag 32 can be stored or transmitted in separate data channels. Similarly, the key 26 can be stored or transmitted in yet another data channel, or the key 26 can be stored or transmitted in the same data channel as either the core 30 or the flag 32. It should be noted, however, that the core 30 and flag 32 may be stored or transmitted in the same data channel without departing from the scope of the present invention.

Figure 3:
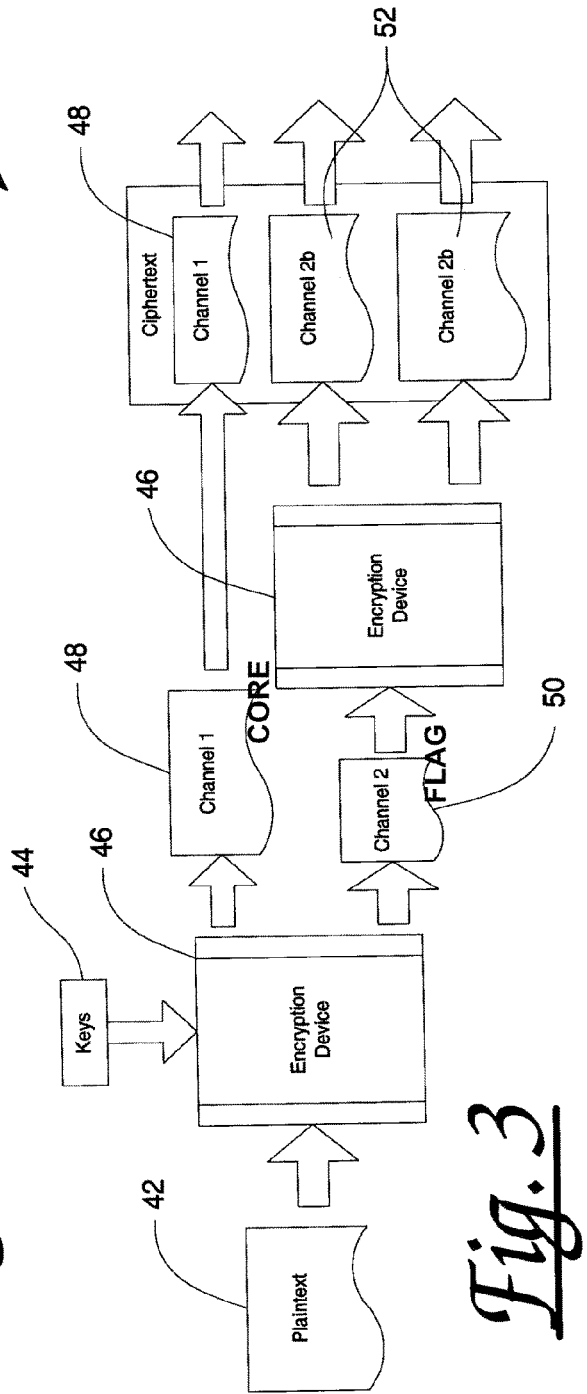
FIG. 3 is a simplified, exemplary block diagram depicting another embodiment of the cryptographic system described herein.

Referring now to FIG. 3, a simplified, exemplary block diagram depicting another embodiment of the present invention is shown. This embodiment demonstrates a multiple-channel cryptographic system 40. As seen therein, plaintext 42 and a key 44 may be received by an encryption device 46 producing a core 48 and a 50 flag. The core 48 may be stationed in its own data channel. In this example, the flag 50 may undergo another round of encryption resulting in second core and flag pair 52. However, it is understood that both a flag and a core, or the core only, can undergo additional rounds of encryption resulting in additional core and flag pairs. For each round of encryption, a new key is generated to track the transformations. As shown, the output of the additional rounds of encryption can be stored in the same or separate data channels as well. Thus, at the end of several rounds of encryption, several key, core and flag sets are created and stored or transmitted in one or more data channels. No recovery of the plaintext is possible should even one of the components be unknown.

The system according to the present invention uses a cryptographic mechanism of dividing the ciphertext into two or more parts. When one wants to recover the encrypted data, one has to know all the parts and the key. This mechanism can be so universal that it can be used in a variety of applications. Special applications may require special modifications to an encryption algorithm for implementation. For example, instead of restricting the size of a block of ciphertext in standard block ciphers, rather the core generated according to the present invention can be so limited while the remainder of the file can be output as a flag. Thus, the speed of encryption may not be compromised.

In other applications, a parameter that permits the number of rounds of encryption to be set can be a sufficient modification. However, it is not a requirement of the present invention for the number of rounds of encryption to be fixed in the encryption algorithm. Rather, the number of rounds of encryption can be determined randomly, or based in part upon the size of the plaintext, and so on.

Figure 4:
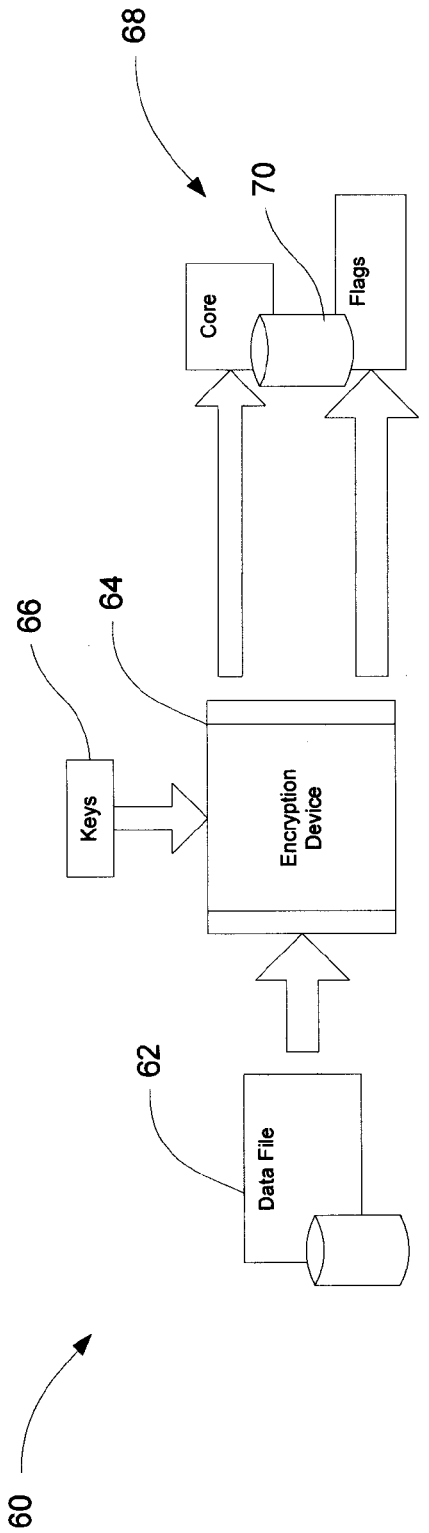
FIG. 4 is a simplified, exemplary block diagram depicting yet another embodiment of the cryptographic system described herein.

Referring now to FIG. 4, a simplified, exemplary block diagram of another embodiment of a cryptographic system 60 is shown. This embodiment may pertain to file oriented encryption where an application requires the plaintext data to be encrypted as a whole. Accordingly, an entire data file 62 is input to an encryption device 64 according to the present invention along with key(s) 66 resulting in an output ciphertext 68 comprising a core and a flag block 70. If additional rounds of encryption are required, additional keys and core and flag blocks are generated.

Figure 5:
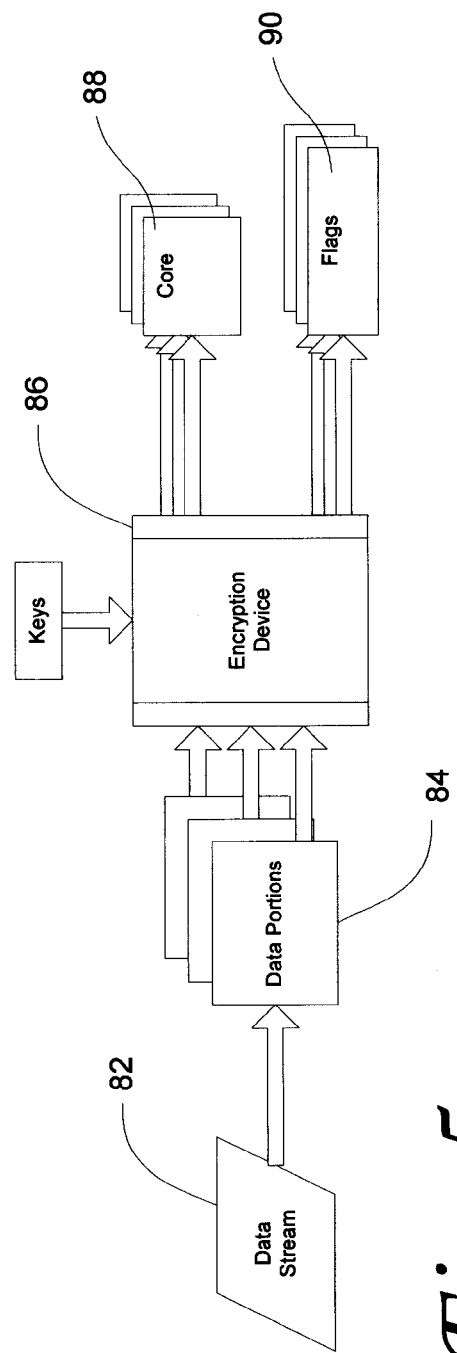
FIG. 5 is a simplified, exemplary block diagram depicting still yet another embodiment of the cryptographic system described herein.

Referring now to FIG. 5, a simplified, exemplary block diagram depicting yet another embodiment of a cryptographic system 80 is shown. This embodiment may pertain to data stream encryption where an application requires real-time transmission of data such as is required by network communications. In this instance, the algorithm according to the present invention can be modified such that a data stream 82 can be divided into blocks, and data portions 84 of the original data or plaintext are accumulated. As these portions 84 are being accumulated, they can be encrypted by an encryption device 86, and corresponding cores 88 and flags 90 may be generated for each. Decryption can be done in portions as well.

Figure 6:
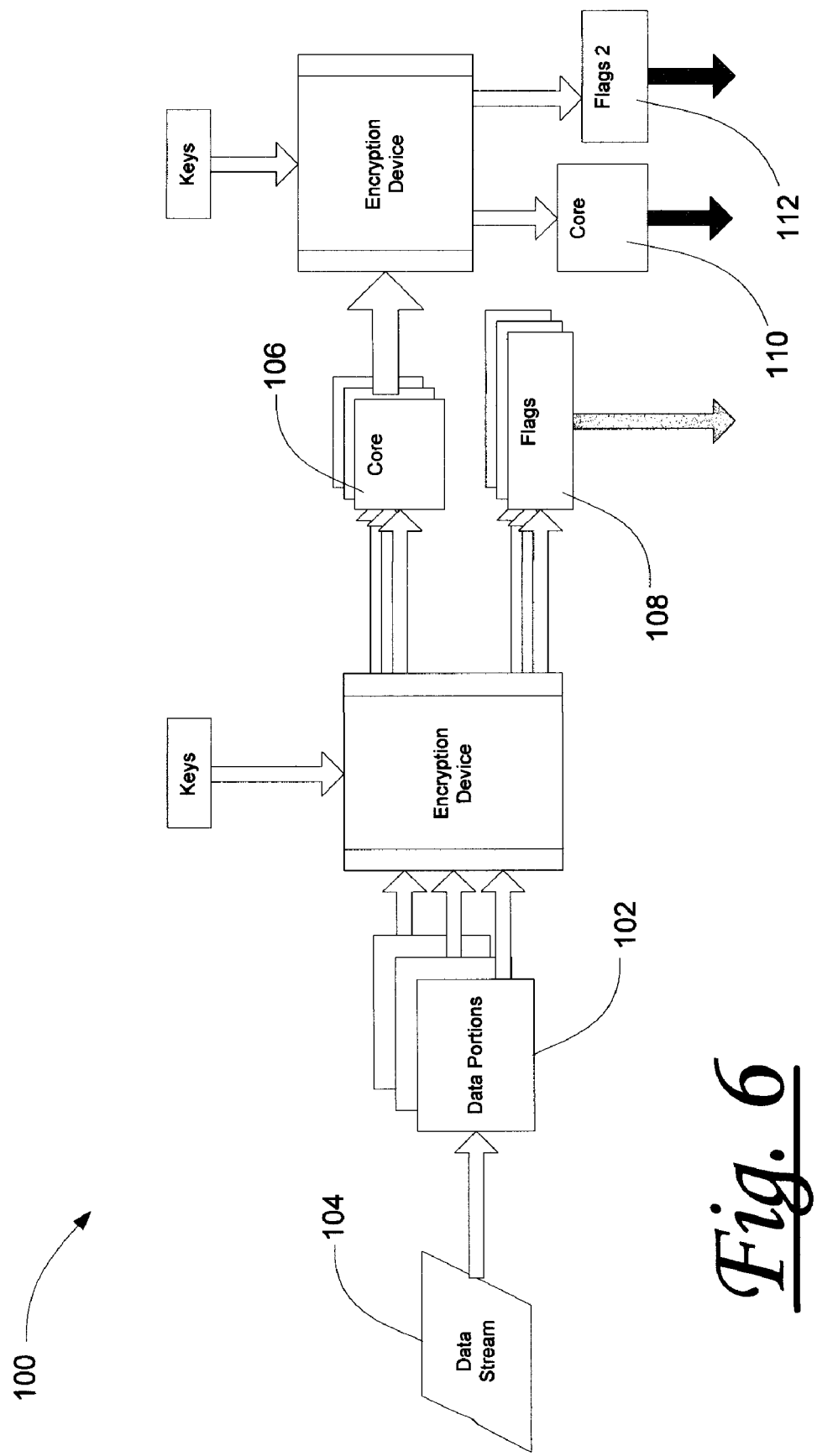
FIG. 6 is a simplified, exemplary block diagram depicting an embodiment of a three-channel cryptographic system as described herein.

Referring now to FIG. 6, a simplified, exemplary block diagram depicting a three-channel cryptographic system 100 according to the present invention is shown. In applications for the protection of digital media against illegal playback, a small core may be obtained for a large volume of data and uniform decryption of the stream of encrypted data should be achieved. As shown in the figure, the original portions 102 of a data stream 104 undergo encryption resulting in corresponding cores 106 and flags 108. While the flags 108 are output, the cores 106 undergo additional encryption resulting in at least two additional outputs, a final set of one or more cores 110 and a second set of one or more flags 112.

Figure 7:
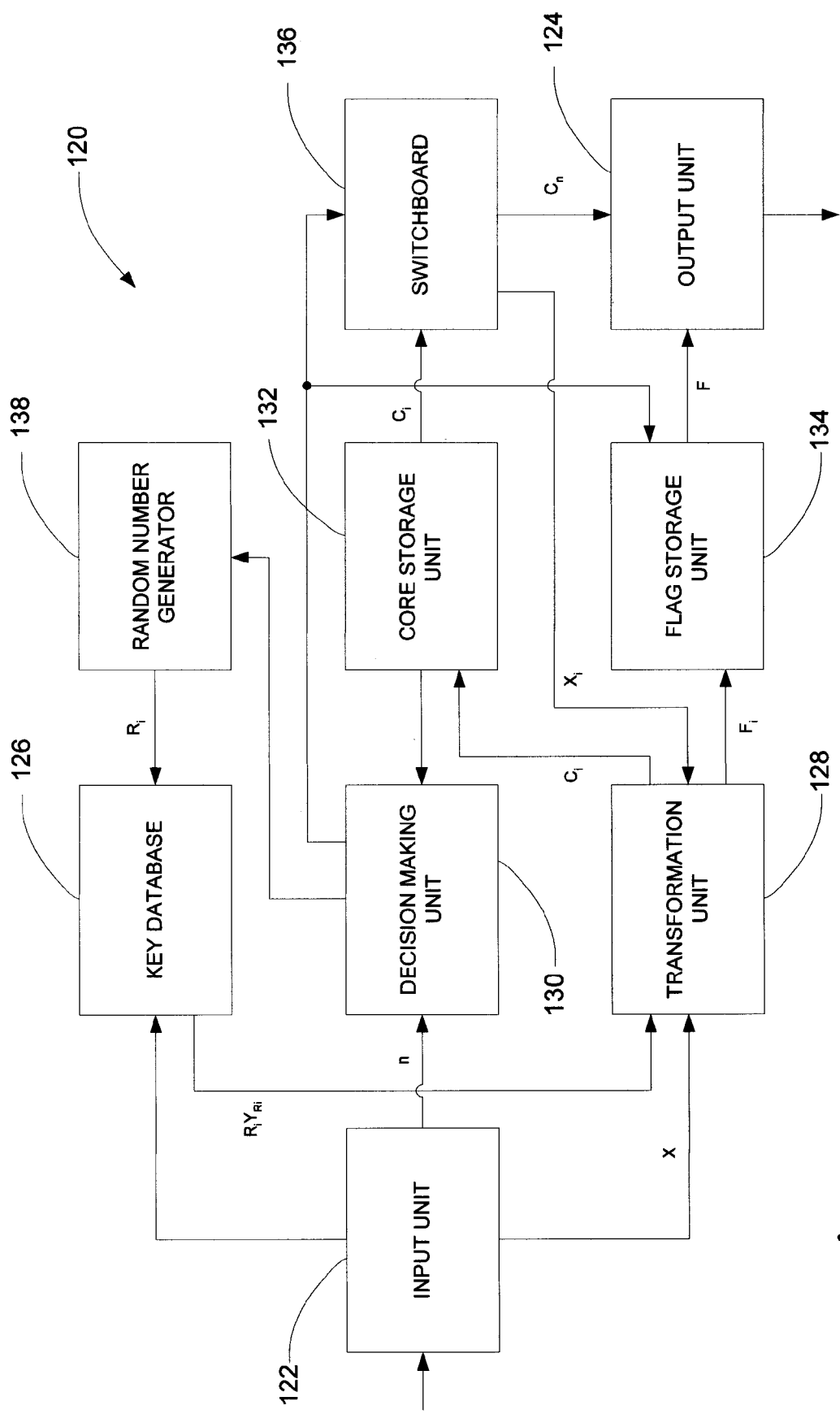
FIG. 7 is a simplified, exemplary schematic diagram depicting one embodiment of a cryptographic system described herein.

Referring now to FIG. 7, a simplified, exemplary schematic diagram depicting one embodiment of a cryptographic system 120 according to the present invention is shown. The cryptographic system 120 comprises an input unit 122 for receiving plaintext and an output unit 124 for outputting ciphertext having at least two components. The at least two components include one or more cores and one or more flags. The input unit 122 can communicate with a key database 126 and a transformation unit 128. The key database 126 may include ordering sets of tables and some auxiliary data, and can compute keys, which track the transformation of data for each round of encryption. The transformation unit 128 can transform or encrypt the plaintext by encoding the plaintext and damaging it to create the ciphertext comprising a core and a flag. The transformation of the original data or plaintext can be tracked by a key computed by the key database 126 and communicated to the transformation unit 128. The input unit 122 may also communicate with a decision making unit 130 in instances where the number of rounds of encryption is based at least in part upon characteristics of the plaintext, such as the length or file type.

The cryptographic system 120 may further include a core storage unit 132 and a flag storage unit 134, both of which cooperate with the transformation unit 128. The core storage unit 132 can accumulate one or more cores output by the transformation unit 128. The number of cores received by the core storage unit 132 may correspond to the number of rounds of encryption. Likewise, the flag storage unit 134 can accumulate one or more flags output by the transformation unit 128. The number of flags received by the flag storage unit 134 may correspond to the number of rounds of encryption as well. Once all of the data from the transformation unit 128 is output, the current round of encryption can end. Correspondingly, the decision making unit 130, which can communicate with the core storage unit 132 is activated to determine whether the condition of encryption process termination is met, i.e. whether additional rounds of encryption remain.

Should the decision making unit 130 determine that additional rounds of encryption remain, it can signal the transformed data to return to the transformation unit 128 for additional transformation. A new key may be computed to track the current round of encryption and a new core and flag pair a new core, or a new flag may be created and stored in the corresponding storage units. For descriptive purposes, each time transformed data is returned to the transformation unit 128 for additional transformation or encryption, the transformed data is treated as if it is plaintext.

On the other hand, should the decision making unit 130 determine that no additional rounds of encryption are required, it can signal for the ciphertext to be sent to the output unit 124 where the ciphertext is output as cores and flags along with the corresponding keys—all of which are required to decrypt the ciphertext.

The cryptographic system 120 may also include a switchboard 136 in communication with the decision making unit 130 for receiving instructions as to whether additional rounds of encryption remain to be performed. The switchboard 136 can also receive transformed data from the core storage unit 132 and send it to the transformation unit 128 if instructions are received to continue the encryption process. Alternatively, the switchboard 136 can send the transformed data to the output unit 124 if instructions to terminate the encryption process are received.

Moreover, the cryptographic system 120 according to an embodiment of the present invention may further include a random number generator 138 in communication with the decision making unit 130 and the key database 126. The random number generator 138 can, among other things, influence the number of rounds of encryption through random selection or influence the particular transformation or damaging operation in a given round through key computation.

Figure 8:
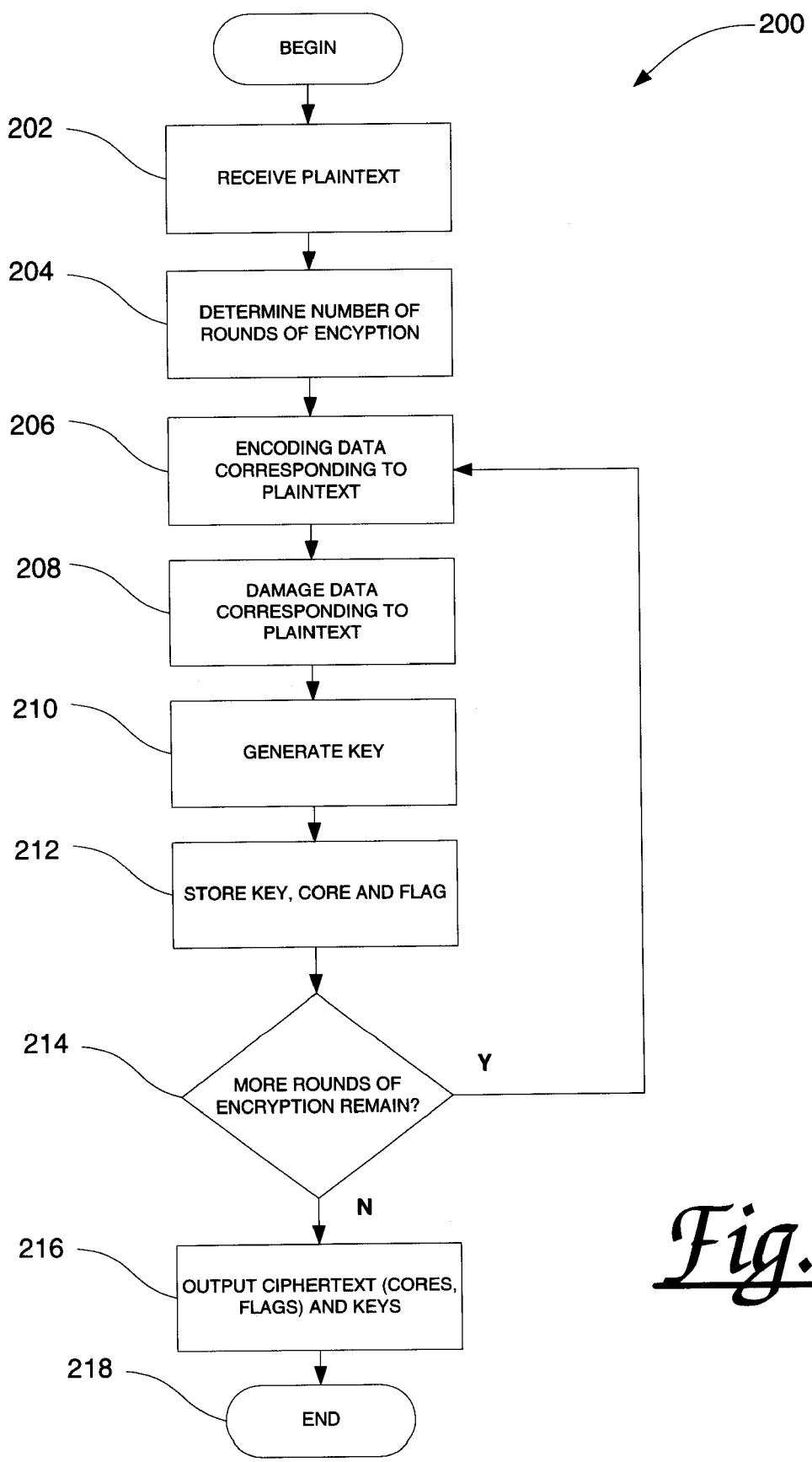
FIG. 8 is a simplified, exemplary flowchart depicting one embodiment of the cryptographic method described herein.

Referring now to FIG. 8, a simplified, exemplary flowchart depicting one embodiment of a cryptographic method (200) is shown. As seen therein, original information in the form of plaintext can be received by an encryption device (202) and the number of rounds of encryption can be determined (204). Encryption of the plaintext may then commence by encoding the entire plaintext file such that it becomes unintelligible ciphertext (206). At least a portion of the ciphertext may then be damaged such that ciphertext having two components, a core and a flag, is created (208). The damaging operation may include, as non-limiting examples, any of the following operations, alone or in combination: parsing, substituting, transposing, truncating or whitening (i.e., adding null values). The effect of damaging the data corresponding to the plaintext can be to break or split the ciphertext into its core and flag components while further encrypting it. Accordingly, a key can be generated for each damaging incident that corresponds to the core and flag (210). The key, core and flag can then be stored in one or more data channels (212).

Next, the encryption device can determine whether additional rounds or cycles of encryption remain (214). If the encryption device determines that additional rounds of encryption remain, then the ciphertext may undergo additional encryption and the process repeats. As additional keys, cores and flags are generated, the ciphertext can become even more secure because each key, flag and core may be required to recover the plaintext.

If, however, the encryption device determines that no further rounds of encryption remain, then the ciphertext comprising one or more cores and flags along with their corresponding keys may be output (216). Action then ends (218).

Outputting the one or more cores and the one or more flags of the ciphertext and the corresponding keys can include storing these three components in one or more data storage media for later retrieval by an authorized user. Accordingly, keys, cores and flags can be stored separately in different data storage media, together in the same data storage media, or in some other combination. Moreover, keys, cores and flags stored within the same data storage medium may be located together or in different data channels. Further, outputting the one or more cores and the one or more flags of the ciphertext and the corresponding keys can include transmitting these three components in one or more data transmission media for access by authorized users over wired or wireless computer networks, for example. Likewise, keys, cores and flags can be stored separately in different data transmission media, together in the same data transmission media, or in some other combination. Moreover, keys, cores and flags stored within the same data transmission medium may be located together or in different data channels.

It should be noted that the method depicted in FIG. 8 and described herein is exemplary only, and that the functions or steps of the method could be undertaken other than in the order described and/or simultaneously as may be desired, permitted and/or possible.

A feature of the method according to the present invention can be illustrated by the following example. Symbols of an initial alphabet A $\{a1, a2, \ldots, an\}$ can be such that the binary representation of each symbol can have an identical length for the whole alphabet A. These symbols of the initial alphabet A can be substituted with symbols of an alphabet Bi {b1i, b2i, . . . , bni} being such that the binary representation of each symbol may have a various length. The process of such replacement can be iterative, i.e., at each i-step for an initial communication there can be used a result of the substitution obtained at the i-step. At each i-step there may be used its own substitution alphabet Bi, produced with the help of the function $Y_i$, selected by a casual mode from a plurality of functions transferred to the addressee beforehand. Additionally, at each i-step there may be produced an flag $F_i$ used for restoring the initial communication. As an additional measure of protection from cryptanalysis, on each i-step or on some i-steps, intermixing of the ciphertext resulting from the transformation may be performed. In an outcome of such transformation, a final core may be produced representing finally transformed data ($C_n$). The length of the final core may not be less than the length of one symbol of the alphabet Bn, used at the last step of transformation.

As a result of transformation of the initial communication, at least two output communications can be produced, the core data ($C_n$) and an array of flags (F). The core data and the array of flags can be dependent on each other such that separately they do not make any sense from the point of view of restoring the initial communication, and they may be transmitted through a separate data link.

In an exemplary embodiment, the length of the transformed communication may have the length of one symbol of the substitution alphabet. For example, if the initial communication has a byte representation, the transformed communication may have the one byte length, regardless of the length and kind of the initial communication.

Multiple encryptions of the same initial communication, using the same key, results in various transformed communications. A problem of the closed channel for the key data transfer can be eliminated thereby. Further, modification of any symbol in the transformed communication or flags may bring about the impossibility of restoring the initial communication.

Transformation functions ($Y_i$) may be preset in the form of a table. For example, the initial communication can be represented as N-bit binary sequences. Transformation of compression of the function ($Y_i$) can be preset as a set of $2^N$ triples, $\{(a_k, b_{ik}, f_{ik})\}$, where $a_k$ can be an N-bit initial code, $b_{ik}$ can be a transformed bit code of a variable length not greater N, and only two values of $\{b_{ik}\}$ may have the length of N bit. Then $f_{ik}$ can be the data on the length of the respective $b_{ik}$ in bits. At such representation there may exist such submission $(2^N)!$ $(2^N-1)(2^N-2)$ of various possible functions of transformation such that $$\sum_{i=1}^{2^N} L_{ik} = \min L_{ik},$$

where $L_{ik}$ can be the length of $b_{ik}$ in bits. At N=8 there may be present $\approx 256!*254*255 \ 10^{511}$ of various transformation functions ($Y_i$). In this case, two values of $b_{ik}$ can have the one bit length, four values of $b_{ik}$ can have the two bit length, eight values of $b_{ik}$ can have the three bit length, sixteen values of $b_{ik}$ can have the four bit length, thirty-two values of $b_{ik}$ can have the five bit length, sixty-four values of $b_{ik}$ can have the six bit length, one hundred twenty-eight values of $b_{ik}$ can have the seven bit length and two values of $b_{ik}$ can have the eight bit length.

Then, for an arbitrary function $Y_i$, the average length of the transformed communication X may be equal to:

$$L(C_i(X, Y_i)) = L(X) \frac{2N + \sum_{n=1}^{N-1} n2^n}{N2^N}$$

and the average length of a flag data:

$$L(F_i(X, Y_i)) = L(X) \frac{2N + \sum_{n=1}^{N-1} n2^{N-n}}{N2^N}$$

thus, the average compression ratio at one step of transformation can have the values:

$$K_{flags} = \frac{L(F_i(X, Y_i))}{L(X)} = \frac{2N + \sum_{n=1}^{N-1} n2^{N-n}}{N2^N},$$

for the transformed communication $$K_{core} = \frac{L(C_i(X, Y_i))}{L(X)} = \frac{2N + \sum_{n=1}^{N-1} n2^n}{N2^N},$$

for the flag data.

In particular, for N=8 we may have: $K_{core}=777/1024 \ 0.758$ $K_{flag}=255/1024$.

At performing M transformation cycles, the anticipated average length of the transformed communication may be:

$$L(C(X)) = K_{core}^M L(X),$$

and of the flag data:

$$L(F(X)) = L(X) K_{flags} \sum_{m=0}^{M-1} K_{core}^m = K_{flags} L(X) \frac{K_{core}^m - 1}{K_{core} - 1}.$$

Accordingly, at performing 10 transformation cycles, the average length of the transformed communication of N=8 can be approximately 0.067 of the length of the initial communication. The length of the flag data can be 0.97 of the length of the initial communication. The general length can be approximately 1.037 of the initial length. For 100 transformation cycles, the lengths $10^{-12}$ and 1.04 may be achieved, accordingly.

If at each transformation cycle an S byte of the flag data is added to the transformed communication, then the average length of the transformed communication may be:

$$L(C(X)) = K_{core}^M L(X) + S \sum_{m=0}^{M} K_{core}^m = K_{core}^M L(X) + S \frac{K_{core}^{M+1} - 1}{K_{core} - 1},$$

And length of an flag data may be:

$$L(F(X)) = \sum_{m=1}^{M} K_{flags}\left(K_{core}^{m} L(F) + S \frac{K_{core}^{m+1} - 1}{K_{core} - 1}\right)$$

$$= \frac{K_{flags}}{1 - K_{core}}\left(L(X)(1 - K_{core}^{M}) + S\left(M - \frac{K_{core}^{M+2} - 1}{K_{core} - 1}\right)\right)$$

Referring back to FIG. 7, an initial communication can be received by the input unit 122. Through the input unit 122, the key database 126 can enter pre-generated data on a plurality of characteristic functions that transform values of symbols of the initial communication with specific symbols of the encrypted communication for a whole set of symbols of the type of communications. In the course of processing the encrypted data, the decision making unit 130 can enter the data on the number (n) of transformation cycles of the initial communication.

Before the beginning of the current transformation cycle, the decision making unit 130 may transmit a control signal to the random number generator 138, which generates a random number ($R_i$). The random number may be transmitted to the key database 126 and then to the transformation unit 128. In accordance with the value of $R_i$ from the key database 126, the transformation function of $YR_i$ can be selected, which enters the transformation unit 128. The transformation unit 128 may then calculate the values of $(C_i, F_i) = YR_i(X_i, R_i)$.

The value of $C_i$ can enter the input of the core storage unit 132 and the value of $F_i$ can enter the input of the flag storage unit 134. The core storage unit 132 may transmit a termination signal for the current cycle of transformation to the decision making unit 130. The decision making unit 130 can make a decision on fulfillment of the next transformation cycle or on terminating the process of transformation. In the case of terminating the process of transformation, the finally transformed data ($C_n$) or cores may then be transmitted through the switchboard 136 and the flag data array ($F=\{F_1, F_2, \ldots, F_n\}$) from the flag storage unit 134 can enter the output unit 124. Otherwise, the core data ($C_i$) can enter the transformation unit 128 from the switchboard 136 for fulfillment of the next cycle of transformation.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for encrypting plaintext, the method comprising
   (a) representing the plaintext as a sequence of N-bit binary symbols;
   (b) for each possible N-bit symbol, generating a plurality of K-bit groups, such that K<N, and such that different K-bit groups for the same N-bit symbol have different lengths K and such that the corresponding K-bit groups for different N-bit symbols have different lengths, wherein the set of all the K-bit groups represents a cryptographic key;
   (c) defining a number of transformation rounds M required to transform the plaintext into a ciphertext;
   (d) performing the M transformation rounds on a set of M intermediate cores $C_i$, K being a length of each intermediate core, wherein the plaintext is used as the first intermediate core $C_1$, each round including the steps of:
      i) selecting which set of K-bit groups is used for the current transformation round;
      ii) replacing each j-th symbol in the current intermediate core $C_i$ with the corresponding K-bit group and generating a flag $F_{ij}$ that is a binary representation of the number K;
      iii) forming the next intermediate core $C_{i+1}$ by concatenating the K-bit groups selected in step (ii);
      iv) forming a flag Fi by concatenating all flags $F_{ij}$ generated in step (ii);
   (e) forming the ciphertext comprising a core $C_M$ from the final transformation round and a set of flags $F=\{F_1, F_2, \ldots, F_M\}$ from all the transformation rounds, wherein the ciphertext is decryptable into the original plaintext using the cryptographic key,
   wherein, in at least one transformation round, the intermediate core that is used as an input is a combination of an intermediate core from a prior transformation round and a flap from the prior transformation round.

2. The method of claim 1, wherein M is selected based on desired length of the core $C_M$.

3. The method of claim 1, wherein M is selected based on desired cryptographic security.

4. The method of claim 1, further comprising whitening of the original plaintext.

5. A method for encrypting plaintext, the method comprising
   (a) representing the plaintext as a sequence of N-bit binary symbols;
   (b) for each possible N-bit symbol, generating a plurality of K-bit groups, such that K<N, and such that different K-bit groups for the same N-bit symbol have different lengths K and such that the corresponding K-bit groups for different N-bit symbols have different lengths, wherein the set of all the K-bit groups represents a cryptographic key;
   (c) defining a number of transformation rounds M required to transform the plaintext into a ciphertext;
   (d) performing the M transformation rounds on a set of M intermediate cores $C_i$, K being a length of each intermediate core, wherein the plaintext is used as the first intermediate core $C_1$ each round including the steps of:
      i) selecting which set of K-bit groups is used for the current transformation round;
      ii) replacing each j-th symbol in the current intermediate core $C_i$ with the corresponding K-bit group and generating a flag $F_{ij}$ that is a binary representation of the number K;
      iii) forming the next intermediate core $C_{i+1}$ by concatenating the K-bit groups selected in step (ii);
      iv) forming a flag Fi by concatenating all flags $F_{ij}$ generated in step (ii);
   (e) forming the ciphertext comprising a core $C_M$ from the final transformation round and a set of flags $F=\{F_1, F_2, \ldots, F_M\}$ from all the transformation rounds, wherein the ciphertext is decryptable into the original plaintext using the cryptographic key,
   wherein, in at least one transformation round, the intermediate core that is used as an input is a combination of multiple intermediate cores from prior transformation rounds and multiple flags from the prior transformation rounds.

6. The method of claim 1, wherein the j-th symbols in each intermediate core $C_i$ are intermixed prior to step (ii).

7. The method of claim 1, wherein the plaintext includes any of text, images, video, audio, data files, data streams, and digital media.

8. The method of claim 1, wherein the number M is selected at random.

9. The method of claim 1, wherein the number M is selected based on a size of the plaintext.

10. The method of claim 1, wherein the number M is user-defined.

11. The method of claim 1, further comprising parsing the plaintext into a plurality of binary sequences of predetermined length.

12. The method of claim 1, wherein random bits are added to each intermediate core $C_i$ prior to step (i) to produce a binary sequence of predetermined length.

13. A system for encrypting plaintext, the system comprising:
 a processor;
 a memory; and
 computer code loaded into the memory and executed on the processor for implementing the steps of claim 1.

14. A method for decrypting ciphertext, the method comprising
 (a) representing the ciphertext as a binary core and a plurality of binary flags;
 (b) for each possible N-bit symbol, generating a plurality of K-bit groups, such that K<N, and such that different K-bit groups for the same N-bit symbol have different lengths K and such that the corresponding K-bit groups for different N-bit symbols have different lengths, wherein the set of all the K-bit groups represents a cryptographic key used to encrypt the ciphertext;
 (c) performing M inverse transformation rounds on a set of M flags $F=\{F_1, F_2, \ldots, F_M\}$ and cores C, wherein an input to the first transformation round is a core $C_M$ and flag $F_M$, each transformation round including the steps of:
  i) selecting which set of K-bit groups is used for the current inverse transformation round;
  ii) selecting a flag $F_i$ for this transformation round;
  iii) parsing an intermediate core $C_i$ into sets of symbols $C_{ij}$ based on the flag $F_i$, K being a length of each intermediate core;
  iv) replacing each K-bit group in the current intermediate core $C_i$ with the corresponding N-bit symbols;
  v) forming the next intermediate core $C_{i+1}$ by concatenating the N-bit symbols selected in step (iv);
  wherein the last core is the plaintext, and
  wherein, for at least some transformation rounds, for an intermediate core that had intermixed flags from previous encryption rounds, the input data into the round is parsed into a core and flags.

15. The method of claim 14, further comprising performing an inverse whitening transformation of the last core.

16. The method of claim 14, wherein symbols in each intermediate core $C_i$ are inverse-intermixed prior to step (iii).

17. The method of claim 14, wherein random bits are deleted from each intermediate core $C_i$ prior to step (iii) to produce a binary sequence of a predetermined length.

* * * * *